Aug. 4, 1964   W. T. SHERWOOD   3,143,047
LOW BRIGHTNESS INDICATOR FOR CAMERA
Filed July 30, 1962
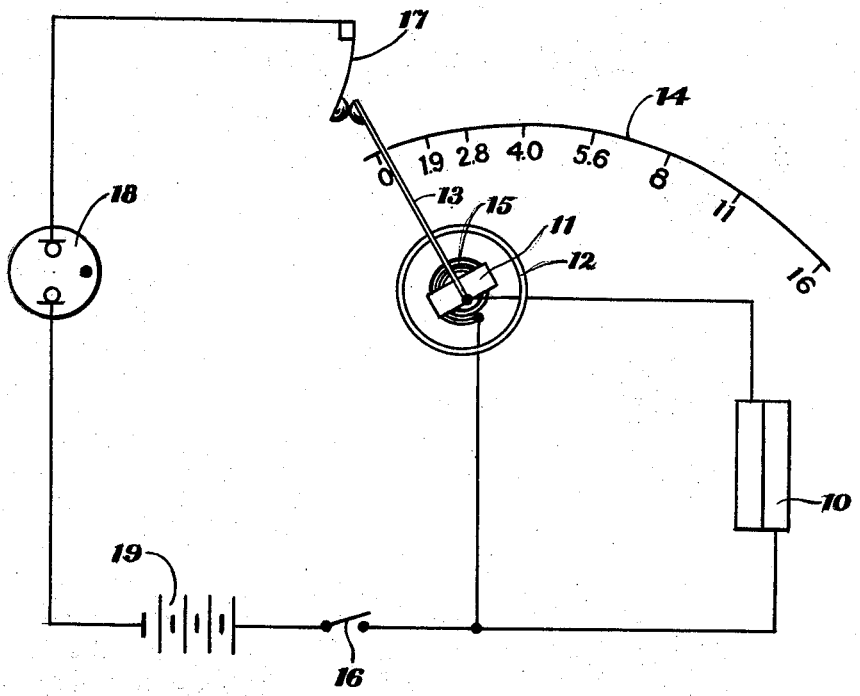
William T. Sherwood
INVENTOR.
BY R. Frank Smith
Robert W. Hampton
ATTORNEYS

3,143,047
LOW BRIGHTNESS INDICATOR FOR CAMERA
William T. Sherwood, Rochester, N.Y., assignor to Eastman Kodak Company, Rochester, N.Y., a corporation of New Jersey
Filed July 30, 1962, Ser. No. 213,301
1 Claim. (Cl. 95—10)

The present invention relates to low scene brightness signals for photographic cameras and more particularly concerns flashing light signals for indicating low scene brightness in cameras having photoresponsive elements.

It is a primary object of the present invention to flash an electric lamp automatically in response to the sensing by a camera's photoresponsive element of field or scene brightness of less than adequate intensity for production of a photographic image by a particular combination of photographic camera and film.

Another object of the invention is to display a flashing light signal in the viewfinder of a camera when field brightness is less than a predetermined low value.

Another object of the invention is to employ a simple, reliable, and inexpensive device to produce in a camera a flashing light signal corresponding to the sensing of field brightness of less than a predetermined low value.

Other objects of the invention will appear from the following description, reference being made to the accompanying drawing showing a partially schematic view of an electrical circuit for an embodiment of the invention.

Generally, the flashing light signal of the invention is produced by periodic closure of a normally open switch which is accomplished by a member moving with a galvanometer coil in response to sensed scene brightness. When the member moves to a predetermined position corresponding to low scene brightness, it closes the switch and completes a circuit for energizing an electric lamp and the galvanometer coil so as to deflect the member from the predetermined position. Such deflection re-opens the switch, thus de-energizing the lamp and the coil whereupon, if the low scene brightness prevails, the member will again move to the predetermined position for closing the switch, energizing the lamp, and completing a cycle which establishes the period of a flashing light signal.

The invention includes a photoelectric exposure meter of a type well known in the art consisting of a photocell or photoresponsive element 10 and a galvanometer 12. The photoresponsive element 10 may be a photoresistive, photoconductive, photovoltaic, phototransistive, phototransducive, or other photoresponsive element which is electrically in circuit with a rotationally deflectable coil 11 of the galvanometer 12. The electrical connection of the photocell 10 across the galvanometer coil 11 is accomplished through electrically conducting pointer 13, arranged for movement or deflection with the coil 11 across a scale 14, and through conducting spring 15, arranged for biasing the coil and pointer towards a reference or zero position such as illustrated in the drawing.

In a manner well known in the art, the coil 11 and pointer 13 are deflected under control of photocell energization from the illustrated reference position to upscale positions as a function of scene brightness. This deflection occurs against the tension of spring 15. The coil and pointer, which move together, may be employed in any of a variety of well known structural systems for automatically or semi-automatically regulating exposure of film in the camera in response to changes in field brightness. For purposes of simplicity, the galvanometer 12 in the drawing is illustrated only as an indicating instrument cooperating with scale 14.

When prevailing field brightness falls to a low level predetermined by the parameters of a camera and film, the pointer 13 of the galvanometer 12 moves to the predetermined reference or zero position corresponding to such low scene brightness as illustrated in the drawing. At this point, the pointer 13 engages electrical contact 17 so as to complete a lamp circuit including contact 17, neon glow lamp 18, battery 19, camera operating switch 16, coil 11, and pointer 13. Thus the pointer 13 cooperates with contact 17 to operate as a normally open electric switch. If camera operating switch 16 is closed, the battery 19 energizes neon lamp 18 to produce a light visible to the camera operator. Light from the lamp 18 may be transmitted to a camera viewfinder, not shown, in a manner well known in the art.

Battery 19 is also arranged for energizing coil 11 for driving coil 11 and pointer 13 upscale. Upscale movement of pointer 13 causes its disengagement from contact 17 so as to open the lamp circuit which discontinues the energization of lamp 18 and coil 11 by battery 19. If at this time, the prevailing field brightness remains at or below the predetermined low level, the spring 15 moves the coil 11 and pointer 13 back down scale to the point where pointer 13 re-engages contact 17 re-completing the lamp circuit for energizing the lamp 18 and again deflecting the coil and pointer upscale. This sequence of events is repeated cyclically for producing a flashing light signal.

The flashing frequency of the lamp is approximately inversely proportional to the amount of light falling on the photocell 10 so that the lamp flashes more rapidly as scene light diminishes in brightness below the predetermined low level. This feature can be utilized to make the signal a sharper stimulus to the camera operator as field light decreases below the lowest adequate level.

A neon lamp is used because its relatively low electrical current requirements tend to keep the currents involved low enough to avoid meter damage.

Of course, the member moving with coil 11 for completing the lamp circuit by engaging contact 17 need not be a pointer but could be a variety of members moving with coil 11. Furthermore, although the invention has been described in detail with particular reference to a preferred embodiment thereof, it will be understood that variations and modifications can be effected within the spirit and scope of the invention as described hereinabove and as defined in the appended claim.

I claim:

In a photographic camera having a viewfinder, a photoresponsive element illuminatable by scene light, and a galvanometer including (a) a coil energizable under control of said element and mounted for deflection in a first direction in response to said energization, (b) a member movable with said coil, and (c) a spring for urging said coil in a second direction opposite said first direction, a flashing light low-scene-brightness signal device comprising in combination:

(1) a relatively low power consumption electric lamp in series circuit with said coil and supported by said camera in such a position that light therefrom is visible in said viewfinder;

(2) a battery in series circuit with said coil and said lamp for energizing said coil and said lamp, the polarity of said battery with respect to said coil being arranged so that energization of said coil by said battery causes deflection of said coil in said first direction;

(3) a normally open switch closable in response to movement of said member to a switching position corresponding to a predetermined low value of scene brightness for completing an electric circuit including said battery, coil and lamp for energizing said lamp and said coil to deflect the latter in said first direction, said switch being adapted for re-opening in response to deflection of said member in said first direction away from said switching position, whereupon said lamp and coil are de-energized and said member is biased toward said switching position by said spring, for generating a flashing light signal the period of which varies as a function of the value of scene brightness below said predetermined low value.

References Cited in the file of this patent

UNITED STATES PATENTS

| | | |
|---|---|---|
| 3,003,389 | Stimson | Oct. 10, 1961 |
| 3,041,949 | Buhrle | July 3, 1962 |
| 3,043,203 | Buhrle | July 10, 1962 |